United States Patent [19]

Townsend

[11] 4,213,058
[45] Jul. 15, 1980

[54] LOAD SHEDDING TIMER FOR A POWER MANAGEMENT SYSTEM

[75] Inventor: Greg M. Townsend, Rolling Meadows, Ill.

[73] Assignee: Motorola, Inc., Schaumburg, Ill.

[21] Appl. No.: 927,268

[22] Filed: Jul. 21, 1978

[51] Int. Cl.$^2$ .............................................. H02J 13/00
[52] U.S. Cl. ........................................ 307/40; 307/39; 307/141.4; 340/141.54
[58] Field of Search ........................ 307/35, 38, 39, 40, 307/41, 265, 141, 141.4; 328/48, 58; 340/309.1, 141.54; 361/154, 187; 343/225, 228

[56] References Cited

U.S. PATENT DOCUMENTS

| | | | |
|---|---|---|---|
| 3,359,551 | 12/1967 | Dennison | 307/38 |
| 3,549,955 | 12/1970 | Paine | 361/187 |
| 3,579,052 | 5/1971 | Kato | 361/154 |
| 4,020,358 | 4/1977 | Wyland | 307/39 |

Primary Examiner—Michael L. Gellner
Assistant Examiner—S. D. Schreyer
Attorney, Agent, or Firm—James W. Gillman; James A. Scheer

[57] ABSTRACT

A central controller is operable to transmit load shed commands to a plurality of power loads should power consumption become excessive. An improved timer at the load site responds to a shed command to cause the load to be shed for a random time period between predetermined minimum and maximum time limits. Because the loads return to the system at random times, peak instantaneous demands on the power generating equipment are avoided.

5 Claims, 5 Drawing Figures

Fig. 3
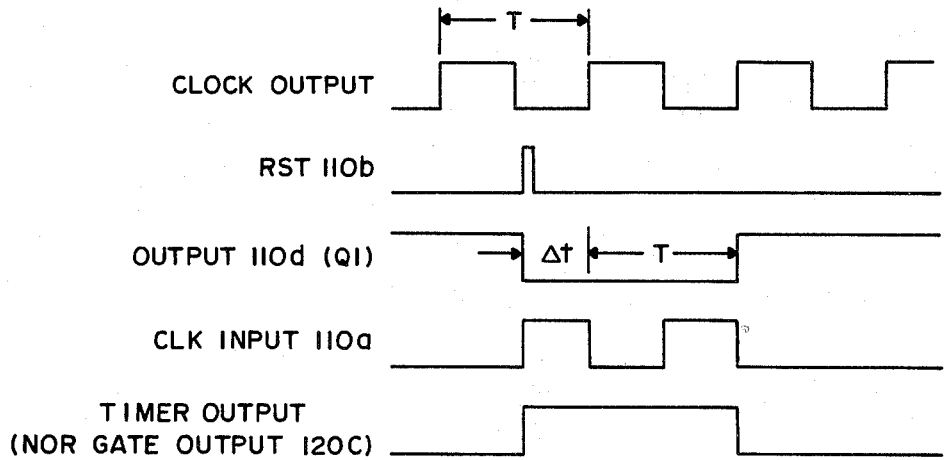
Fig. 4
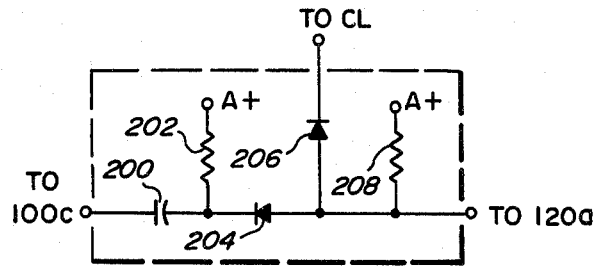
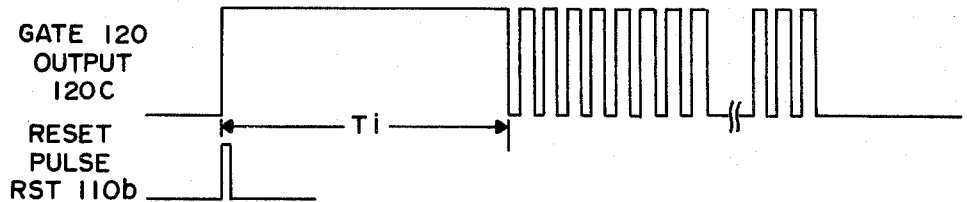
Fig. 5

LOAD SHEDDING TIMER FOR A POWER MANAGEMENT SYSTEM

BACKGROUND OF THE INVENTION

The present invention pertains to the electical power management art and, more particularly, to an improved load shed timer.

Timers utilized to activate load shedding relay in utility load management systems are well known in the power management art. In such systems, a central controller monitors electical power being consumed by a plurality of load sites. During periods of peak power consumption it is desirable to disconnect from, or "shed" certain deferable loads from the system. This is accomplished by providing at the load sites a means to interrupt power to deferable loads, such as water heaters or air conditioners, for a given time interval. Generally, a command signal is transmitted by the central controller indicating the need to shed loads. This signal is received by a receiver at the remote load site, thereafter activating a timer which "times out" the load for a given time period. It is perferable that the time out period be between certain minimum and maximum time limits but, more importantly, it is desirable to make the time period totally random between these limits such that multiple loads do not switch back onto the system simultaneously thereby generating a large instantaneous increased power demand on the power generating equipment.

Two basic load shedding timer configurations have been known in the prior art. The first incorporates a standard RC timing circuit. Here, upon receipt of a shed command from the central controller, the load is taken off the system for a time determined by the voltage across a capacitor being charged through a given value resistor. Variations in the value of resistance and capacitance are relied upon to bring the loads back onto the system at varying time periods. It has been found, however, that despite variations in values of resistance and capacitance from one load site to the next, such systems result in clusters of load sites coming back onto the system within a very short time interval, resulting in a high differential power demand.

The second prior art shedding timer utilized a digital counter. Here, upon receipt of a shed command from the central controller, the counter is fed a clock signal causing the counter output to increment. By connecting the shedding relays in the load sites to different counter outputs, a systematic arrangement can be effected whereby a limited number of sites come back onto the system at a given time. Nonetheless, this system has proved undesirable in that groups of sites simultaneously come back on system at different incremental periods, generating a staircase demand curve.

In addition, the prior art shedding timers suffered the further problem that those users whose timer interval is the greatest always suffer the longest interruption.

Thus, there has been a long felt need in the power management art for a timer which restores load sites in a linear manner between minumum and maximum time limits in order to prevent the generation of large differentials in the power demand curve.

SUMMARY OF THE INVENTION

It is an object of this invention, therefore, to an improved power shedding timer which assures restoration of a plurality of load sites to the power management system in a linear manner.

More particularly, it is an object of this invention to provide an improved shedding timer which causes its associated load to be shed from the power system for a random time period between predetermined minimum and maximum time limits.

Briefly, according to the invention, the improved timer is provided in a power management system wherein a remote location at a power load site is responsive to a command from a central controller to shed the load for a time interval determined by the timer. The improved timer is comprised of timing means which responds to a command from the central controller to cause the load to be shed for a random time period between predetermined minimum and maximum time limits.

Preferably, the timing means is comprised of an asynchronous clock which produces a clock signal having a period equal to the desired minimum time interval. Also, the timing means is comprised of logic which responds to the central controller command to cause the load to be shed for at least one full clock signal period. It is preferred that the logic means be comprised of means to cause the load to be shed for two predetermined transitions of the clock signal following the occurrence of the central controller command such that the aforedescribed random time period is a function of the instant of occurrence of the command and the relative phasing of the clock signal.

BRIEF DESCRIPTION OF THE DRAWINGS

FIG. 3 is a series of waveforms illustrating operation of the timer shown in FIG. 2;

FIG. 4 is a schematic diagram of an alternate construction which may be incorporated in the schematic of FIG. 2 to reduce shedding relay power consumption; and FIG. 5 illustrates waveforms representative of operation of the circuit of FIG. 4 when employed in the detailed schematic diagram of FIG. 2.

DETAILED DESCRIPTION OF THE PREFERRED EMBODIMENT OF THE INVENTION

Figure 1:
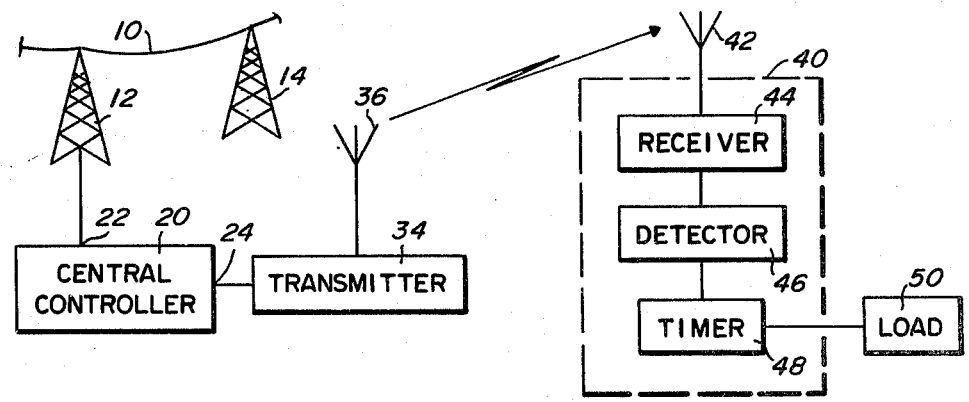
FIG. 1 is a block diagram of a load management system including the inventive load shedding timer.

FIG. 1 is a generalized block diagram of a power management system. Here, a power line 10, supported by towers 12, 14, routes power to a series of load sites, one being indicated as load 50. A central controller 20 monitors power on the line 10 at an input 22. The central controller 20, variations of which are well known in the prior art, includes means to compare the power on the power line 10 with reference levels and determine whether or not power consumption by the loads exceeds certain limits. If a limit is exceeded, the central controller generates a suitable command signal at its output line 24. This command signal is coupled to the input 32 of a radio frequency transmitter 34. Upon receiving the command signal, the transmitter modulates the generated carrier therewith, broadcasting the command over an antenna 36.

The load shedding command signal is received at the various load sites. Here, for illustrative purposes, the signal is shown coupled to the antenna 42 of a load site controller 40 which controls a load 50. The signal picked up by antenna 42 is routed to a load site receiver 44 which, in the conventional manner, recovers the command signal. The presence of the command signal is detected by a conventional detector 46 which, should a proper command be received, activates an associated timer 48. Upon timer 48 being activated, the load is disconnected, or shed from the power line 10 for a time interval as determined by the timer 48.

In the instant invention, timer 48 is operable to shed the load 50 for a random time interval between certain minimum and maximum limits. A minimum limit is necessary to allow recovery of the power management system from the peak load condition. A maximum time limit is necessary to assure restoration of operation of the load. Ideally, between these minimum and maximum limits each timer at a given load site should cease its shedding interval at a random time period. With the loads at the various load sites returning on system at random time intervals, this assures a linear load restoration on the power management system, thereby avoiding high instantaneous power demand differentials on the power equipment, as could happen in prior art systems when a plurality of load sites returned on system simultaneously.

Figure 2:
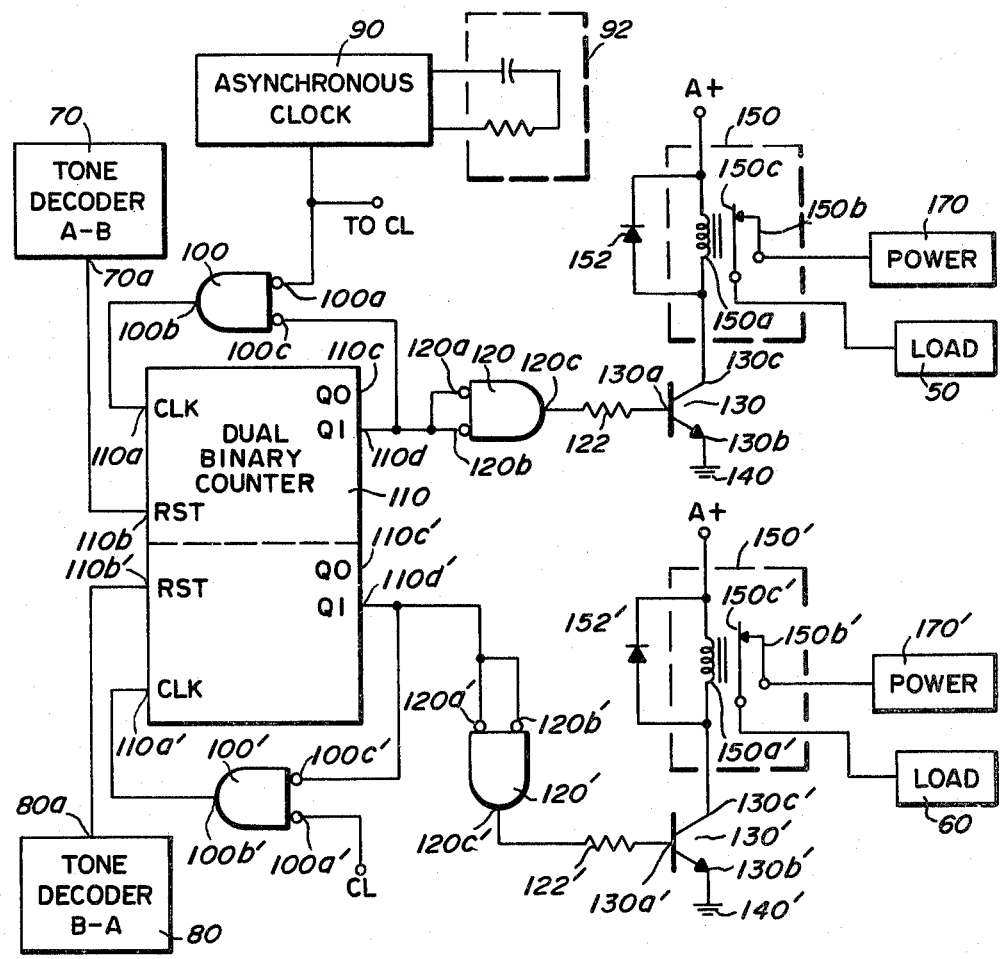
FIG. 2 is a detailed schematic diagram of the preferred embodiment of the load shedding timer.

FIG. 2 is a detailed schematic diagram of the preferred embodiment of the load shedding timer, such as timer 48 in FIG. 1.

In this embodiment, the system is responsive to an ordered two-tone command from the central controller to shed either a first load 50 or a second load 60. Thus, if the command from the central controller is a tone of first frequency A followed by a tone of second frequency B this is detected by a tone decoder 70 and, as is described hereinbelow, load 50 is shed. However, if the command is of the form of a tone of a frequency B followed by a second frequency A this is detected by a tone detector 80 resulting in shedding of the second load 60.

The improved timer includes an asynchronous clock oscillator 90 which produces an output clock signal of period T, as determined by a conventional RC circuit 92. The first wavform of FIG. 3 illustrates the output from the clock oscillator. As is discussed more fully hereinbelow, the clock period T is selected to be the minimum time limit for the load shedding interval.

The clock output from asynchronous clock 90 is fed to the first input 100a of a conventional NOR gate 100. The output 100b from NOR gate 100 is fed to the clock input 110a of a binary counter 110. In the instant embodiment, binary counter 110 is comprised of a dual counter, with the second counter being utilized in the detector for shedding the second load 60.

Binary counter 110 also has a reset input 110b and first and second binary outputs 110c, 110d, respectively. The output 70a of the tone decoder A-B is coupled to the reset input 110b of the binary counter. In the conventional manner, the binary counter 110 responds to the falling transitions of signals applied at its clock input 110a to binarily increment its outputs 110c, 110d. Upon application of a reset pulse at its reset input 110b, the binary outputs 110c, 110d are returned to the low, or zero state.

The second output 110d from binary counter 110 is connected both to the second input 100c of NOR gate 100 and to the common inputs 120a, 120b of a second NOR gate 120. The output 120c of NOR gate 120 connects through a current limiting resistor 122 to the base terminal 130a of bipolar transistor 130. The emitter terminal 130b of transistor 130 is connected to reference, or ground potential 140 whereas the collector terminal 130c is connected through the coil 150a of a conventional load shedding relay 150, to a source of DC bias, A+. A standard damping diode 152 is placed across the coil 150a to damp out the ringing of the coil.

The contacts 150b, 150c of load shedding relay 150 are normally closed, such that the contacts become open upon sufficient current passing through the coil 150a.

The first relay contact 150b connects to a source of power, which in the instant load management system is the power mains 170. The second relay contact 150c connects to the load 50.

Operation of the instant timer may be understood as follows, with reference to FIG. 3.

A reset pulse from tone decoder 70, indicating the presence of a load shedding command, resets the counter's outputs 110c, 110d to a low state. With the second input 100c of NOR gate 100 low, NOR gate 100 is enabled whereby clock pulses from asynchronous clock 90 are coupled to the clock input 110a of binary counter 110. Upon receiving the second negative transition of the input signal from the clock 90, the counter's second output 110d assumes a high state, thereby causing NOR gate 100 to inhibit further clock signals from reaching the clock input 110a of binary counter 110. Thus, the second output 110d from the binary counter 110 is the timer interval, and, after being buffered and inverted through NOR gate 120, biases transistor 130 to a conducting condition, thereby activating load shedding relay 150 for the duration of the timer output interval.

That the time shedding interval is random between minimum and maximum time limits may be understood as follows, with direct reference to FIG. 3. As discussed hereinabove, upon receipt of the reset pulse the timer interval is initiated, with the conclusion of the interval occurring two negative transitions at the clock input 110a thereafter. Thus, as is shown in the waveform of the output 110d, the total timer interval will be the period of the clock T plus a varying time interval $\Delta t$, depending upon the relative phasing of the clock at the occurrence of a reset pulse. For example, if the reset pulse should occur immediately before the negative transition of a clock signal, as inverted through NOR gate 100, then the total period of the timing interval would be its minimum, or a period of T ($\Delta t = 0$). Should, however, a reset pulse occur immediately after the positive transition of the clock, as inverted through NOR gate 100, then the maximum possible time interval would occur, with the total time period of $2 \times T$ ($\Delta = T$).

In the general case, since the clock 90 runs in a totally asynchronous rate with respect to a reset pulse, the value $\Delta t$ will be randomly located between the minimum and maximum limits. This randomness assures that the various loads on the load management system will return on line in a random order, thereby minimizing or limiting subsequent peak loading.

The timing circuit for load shedding the second load, load 60, operates in an identical manner as does the abovedescribed timer for shedding load 50 and, thus, need not be described. For purposes of clarity, the parallel components and connections of the second timing circuit to that of the first are indicated with the same reference numbers primed.

FIG. 4 is a schematic diagram of a modification to the timer of FIG. 2 which results in a substantially reduced power consumption of the shedding relay 130. It has been found that the relay can be activated to open its contacts with a finite duration continuous direct current, thereafter followed by a 50% duty cycle current to maintain the relay in its activated state. The circuitry of FIG. 4 accomplishes this function.

Referring to FIG. 4, a timing capacitor 200 has one end connected to the second input 100c of NOR gate 100, and its second input coupled both through a timing resistor 202 to a source of DC bias A+ and to the cathode of a first diode 204. The anode of diode 204 connects to the anode of a second diode 206, whose cathode connects to the clock output of clock 90. The common anode connection of diodes 204, 206 connects both through a resistor 208 to the DC source A+ and to the first input 120a of NOR gate 120. Thus, a functional "AND" is performed by this circuit. In this embodiment, the only change to the schematic of FIG. 2 would be to disconnect the common connection between the first and second inputs 120a, b of NOR gate 120, connecting the circuit of FIG. 4 to the points shown while retaining the connection of input 120b to the output 110d.

Operation of the circuit of FIG. 4, in the embodiment of FIG. 2, may be understood with reference to the waveforms of FIG. 5. Upon the occurrence of a reset pulse at the reset input 110b of counter 110, the second output 110d of counter 110 is taken low, thereby taking input 120b on NOR gate 120 and one side of capacitor 200 low. This results in the first input 120a of NOR gate 120 being taken to a logic low for the time interval $T_i$ necessary for resistor 202 to charge capacitor 200 to one diode drop below a logic high level. At this point, clock signals from clock 90 are coupled through diode 206 directly to the NOR gate 120 first input 120a, which signals are then passed to the relay transistor 130 appearing as a chopped current to coil 150a of load shedding relay 150. FIG. 5 illustrates the voltage waveform occurring at the output 120c of NOR gate 120 due to the operation of the circuit in FIG. 4, which waveform corresponds to current through the coil 150a of relay 150. Thus, by providing a sufficient initial latch time $T_i$, the relay may be activated to a state such that a chopped current, representative of lower relay consumed power, may be utilized to maintain the relay in its activated state for the duration of the timer interval.

In summary, an improved load shedding timer has been described in detail. The timer is operable to shed a load for a random time interval between certain minimum and maximum limits.

While a preferred embodiment of the invention has been described in detail, it should be apparent that many modifications and variations thereto are possible, all of which fall within the spirit and scope of the invention. For example, whereas the command signal from the central controller to the load site has been indicated as being transferred via radio frequency communication, any other form of connection, as through land lines, could be utilized.

I claim:

1. In a power management system wherein a remote location at a power load site is responsive to a command from a central controller to shed the load for a time interval determined by a timer, an improvement in said timer comprising:
    timing means responsive to said central controller command to cause the load to be shed for a random time period between predetermined minimum and maximum time limits.

2. The improvement of claim 1 wherein the timing means comprises:
    an asynchronous clock means for producing a clock signal having a period equal to said minimum time interval; and
    logic means responsive to said central controller command to cause the load to be shed for at least one full clock signal period.

3. The improvement of claim 2 wherein the logic means includes means to cause said load to be shed for no more than two full clock signal periods, thereby determining said maximum time limit.

4. The improvement of claim 2 wherein the logic means comprises means to cause the load to be shed for two predetermined transitions of said clock signal following the occurrence of said central controller command such that said random time period is a function of the instant of occurrence of said command and the relative phasing of the clock signal.

5. The improvement of claim 1 wherein power to the load is interrupted via activation of a relay means by said timer, the improved timer further comprising:
    means for applying a continuous current to said relay for a predetermined time period to assure activation of said relay at the beginning of said timer interval, and for subsequently applying a predetermined duty cycle discontinuous current to said relay for the duration of said timer interval to thereby reduce relay power consumption.

* * * * *

UNITED STATES PATENT AND TRADEMARK OFFICE
CERTIFICATE OF CORRECTION

PATENT NO. : 4,213,058
DATED : July 15, 1980
INVENTOR(S) : GREG M. TOWNSEND

It is certified that error appears in the above-identified patent and that said Letters Patent are hereby corrected as shown below:

Col. 1, line 23, "perferable" should be -- preferable --.

Col. 1, line 59, after "longest", -- power -- should be inserted.

Col. 3, line 43, "wavform", should be -- waveform --.

Signed and Sealed this

Eighteenth Day of November 1980

[SEAL]

Attest:

SIDNEY A. DIAMOND

Attesting Officer

Commissioner of Patents and Trademarks